United States Patent [19]

MacLean

[11] Patent Number: 4,883,399
[45] Date of Patent: Nov. 28, 1989

[54] PLASTIC ENCAPSULATED NUT AND WASHER ASSEMBLY

[75] Inventor: Barry L. MacLean, Libertyville, Ill.

[73] Assignee: MacLean-Fogg Company, Mundelein, Ill.

[21] Appl. No.: 280,140

[22] Filed: Dec. 5, 1988

[51] Int. Cl.[4] .................. F16B 19/00; F16B 33/00; F16B 37/14

[52] U.S. Cl. .................. 411/431; 411/377; 411/908; 411/910

[58] Field of Search .............. 411/371, 372, 375, 377, 411/429, 431, 910, 368, 908; 10/86 C

[56] References Cited

U.S. PATENT DOCUMENTS

| | | | |
|---|---|---|---|
| 4,373,842 | 2/1983 | Bettini et al. | 411/377 |
| 4,576,533 | 3/1986 | Chartier | 411/431 |
| 4,815,920 | 3/1989 | Morooka | 411/431 |

FOREIGN PATENT DOCUMENTS

| | | | |
|---|---|---|---|
| 153487 | 9/1985 | European Pat. Off. | 411/429 |
| 636531 | 3/1962 | Italy | 411/429 |

Primary Examiner—Neill R. Wilson
Attorney, Agent, or Firm—Mason, Kolehmainen, Rathburn & Wyss

[57] ABSTRACT

A plastic encapsulated nut and washer assembly includes a plastic retainer or body for holding a hex nut and washer in axially aligned abutting relation ready for assembly with an external threaded member. A portion of the plastic retainer provides an annular seal around the washer when the nut is tightened on a threaded member and an extension bore is formed in the plastic material for providing a lock-nut function when the threaded member is extended into the extension bore from the threaded bore of the hex nut.

20 Claims, 2 Drawing Sheets

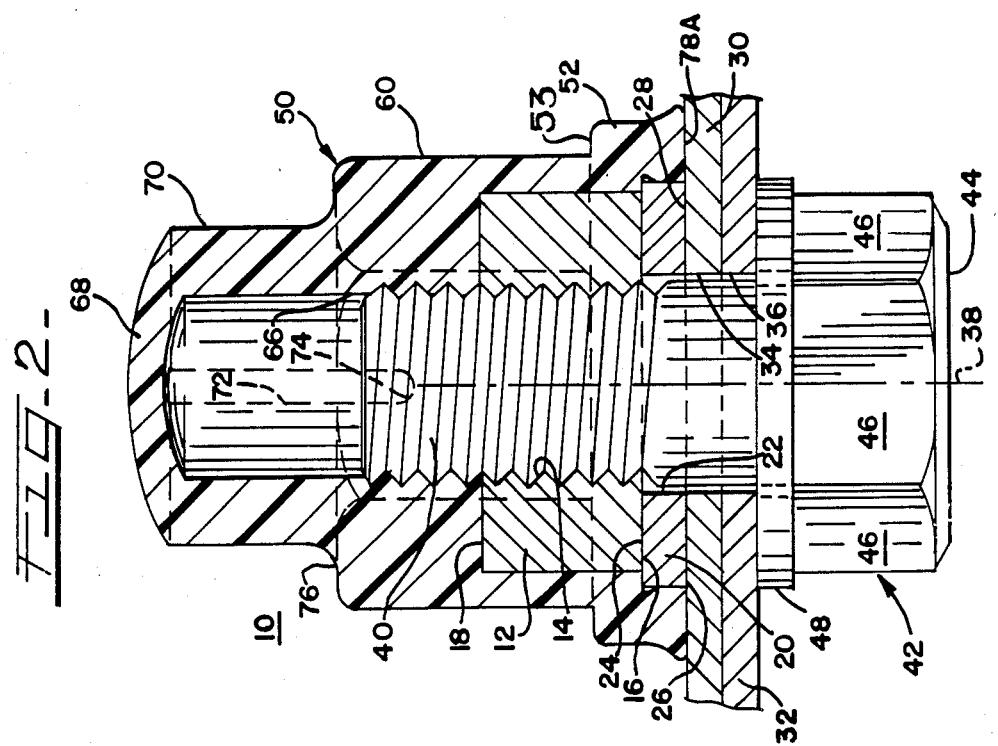
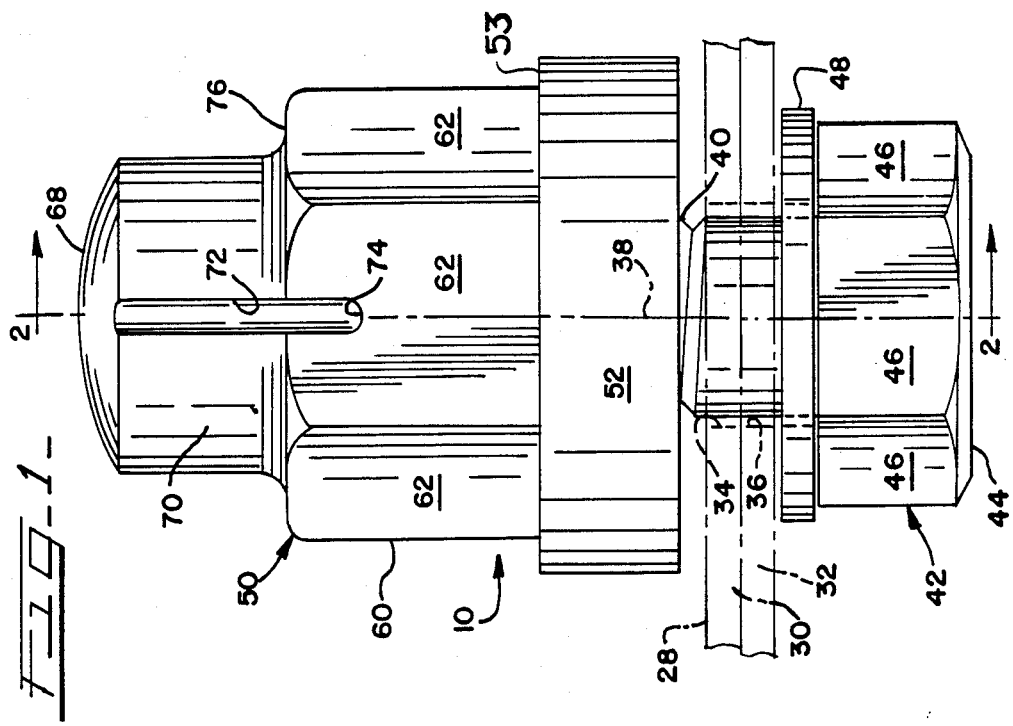

PLASTIC ENCAPSULATED NUT AND WASHER ASSEMBLY

BACKGROUND OF THE INVENTION

1. Field of the Invention

The present invention relates to a new and improved plastic encapsulated nut and washer assembly having a plastic retainer or body forming a peripheral seal around the washer and more particularly, to an assembly of a common ordinary nut and annular washer with a plastic retainer provided for holding the nut and washer in axially aligned, abutting relation ready for assembly with an external elongated threaded member. A portion of the plastic retainer or body provides an annular seal around a peripheral edge of the washer and another portion is formed to provide a locking extension bore for lockingly engaging a threaded member when threaded into and beyond the threaded bore of the encapsulated nut.

2. Description of the Prior Art

U.S. Pat. Nos. 692,812 to Anderson, 1,254,514 to Lehmann, 3,471,158 to Solins, 4,557,654 to Masuda et al and 4,582,462 to Thiel, disclose cap nuts and the like having caps or thread protecting means. U.S. Pat. Nos. 302,046 to Spruce, 2,851,079 to Heller, 3,399,589 to Breed, and 3,622,167 to Velthoven, disclose nuts provided with sealing means. U.S. Pat No. 2,850,064 to Rapata discloses a nut having an elastic gripping action and sealing means. U.S. Pat. No. 4,536,116 to Murray discloses a composite molded plastic article having a metal nut insert. U.S. Pat Nos. 56,124 to Till, 515,089 to McClelland, 4,132,142 to Becker, British Patent No. 1315, British Pat. No. 757519 and Italian Pat. No. 299788 disclose various types of combination nut and washer assemblies.

However, none of the prior art patents disclose a common ordinary hex nut and washer in an advantageous combination with a plastic body or retainer for at least partially encapsulating the nut and washer and for securing the washer and nut in an axially aligned, abutting position ready for insertion of a threaded member.

Accordingly, it is an object of the present invention to provide a new and improved nut and washer combination wherein a common hex nut and washer are positively retained in an axially aligned position by an encapsulating plastic retainer or body in readiness for assembly with a threaded member.

Another object of the present invention is to provide a new and improved nut and washer assembly of the character described wherein a common ordinary polygonally-shaped nut and an ordinary annular washer are positively maintained in a pre-aligned position ready for assembly onto a threaded element by means of a plastic body or retainer which permits relative free rotation between the washer and the nut.

Yet another object of the present invention is to provide a new and improved fastener of the character described wherein an encapsulating plastic body or retainer also serves to provide a lock nut function for restraining the loosening of the nut after engagement on a threaded element.

Still another object of the present invention is to provide a new and improved nut and washer assembly of the character described wherein an encapsulating plastic body provides a peripheral seal around the washer and also provides a cover or cap for enclosing and protecting engaging threads of an assembled threaded member and the encapsulated nut.

Still another object of the present invention is to provide a new and improved combination nut, washer and retainer assembly which is economical to manufacture, easy to use and especially adapted and well suited for use in harsh environmental conditions for sealing out contaminants from threadedly engaged portions of the nut and washer assembly.

BRIEF SUMMARY OF THE INVENTION

The foregoing and other objects and advantages of the present invention are accomplished in an illustrated embodiment comprising an ordinary hex nut and annular washer in combination with a plastic retainer or body which at least partially encapsulates the nut and washer in a pre-aligned position with the bores of the nut and washer axially aligned and the washer positioned adjacent and abutting an end face of the nut. The plastic retainer is designed to positively secure the nut and washer together ready for assembly as a unit with a typical elongated externally threaded member such as a bolt, cap screw or threaded rod. The plastic body also forms an annular peripheral seal around the edge of the washer to seal against an adjacent surface. The encapsulating body in addition provides a protective cap or cover for the threadedly assembled parts of the combination and is provided with an extension bore aligned with the threaded bore of the nut to function as a lock nut segment when engaged by an overdriven threaded portion of a bolt projecting into the extension bore from the the aligned bore of the adjacent encapsulated hex nut.

BRIEF DESCRIPTION OF THE DRAWINGS

For a better understanding of the present invention, reference should be had to the following detailed description taken in conjunction with the drawings, in which:

FIG 1 is a side elevational view of a new and improved plastic encapsulated nut and captive washer assembly constructed in accordance with the features of the present invention;

FIG. 2 is a cross-sectional view taken substantially along lines 2—2 of FIG. 1 and illustrating the encapsulated nut and washer assembly in use with a seal established around the periphery of the washer against an external member;

DETAILED DESCRIPTION OF A PREFERRED EMBODIMENT OF THE PRESENT INVENTION

Figure 4:
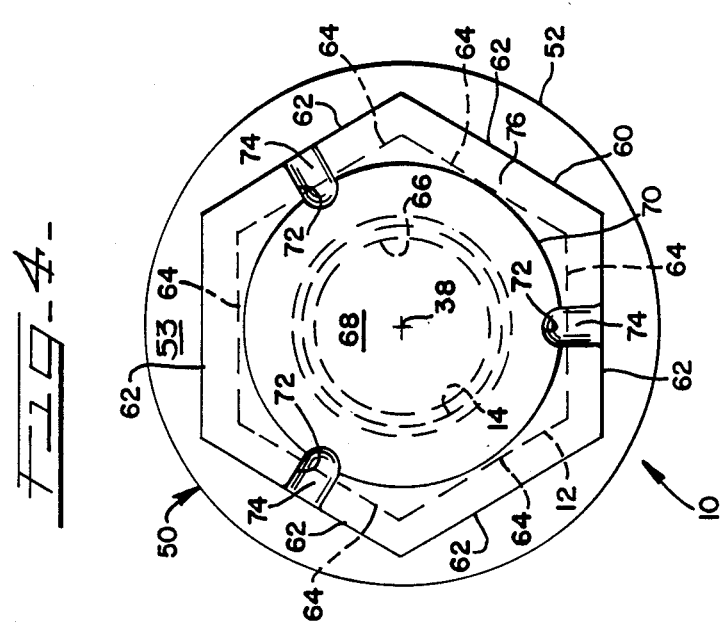
FIG. 4 is a top plan view of the encapsulated nut and washer assembly.

Referring now more particularly to the drawings, therein is illustrated a new and improved plastic encapsulated nut and washer assembly constructed in accordance with the features of the present invention and referred to generally by the reference numeral 10. The nut and washer assembly or fastener assembly 10 includes a common, ordinary metal hex or square nut 12 having a central threaded bore 14 extending between opposite end faces 16 and 18 and an ordinary annular washer 20. The washer is maintained in position adjacent the outer end face 16 of the hex nut and is aligned with a central bore 22 of the washer in coaxial alignment with the threaded bore 14 of the hex nut 12 as shown in FIGS. 2 and 4.

The washer 20 includes flat or planar inner and outer end faces 24 and 26, and the inner end face of the washer is positioned adjacent to and abuts against the outer end face 16 of the hex nut 12. The opposite outer end face 26 of the washer is exposed externally for bearing contact against an adjacent surface 28 of an external part such as a sheet member 30 against which the fastener assembly 10 is mounted.

Typically, a second external part 32 is secured adjacent the first part 30 and both parts are provided with aligned apertures 34 and 36, which apertures, are positioned in coaxial alignment with the central aperture 22 of the captivated washer 20 and the threaded bore 14 of the hex nut 12 along a common axis 38. A threaded shank 40 of a cap screw 42 or other threaded element is easily extended through the aligned apertures or bores 36, 34 of the external parts and the washer bore 22 to engage the female threads of the threaded bore 14 of the encapsulated hex nut 12.

The illustrated cap screw 42 includes an enlarged hex-shaped head 44 having planar wrench flats 46 adapted to receive a wrench used for tightening the threaded shank 40 into the internal female threads in the bore of the hex nut 12. A washer 48 may be provided on an unthreaded portion of the shank 40 adjacent the hexagonal head 44 thereof to bear against the external part 32 as illustrated in FIGS. 1 and 4 so that when the cap screw 42 is tightened, the external parts 30 and 32 are compressed between the captivated washer 20 and the external washer 48 adjacent the head 44 of the cap screw fastener 42.

Figure 3:
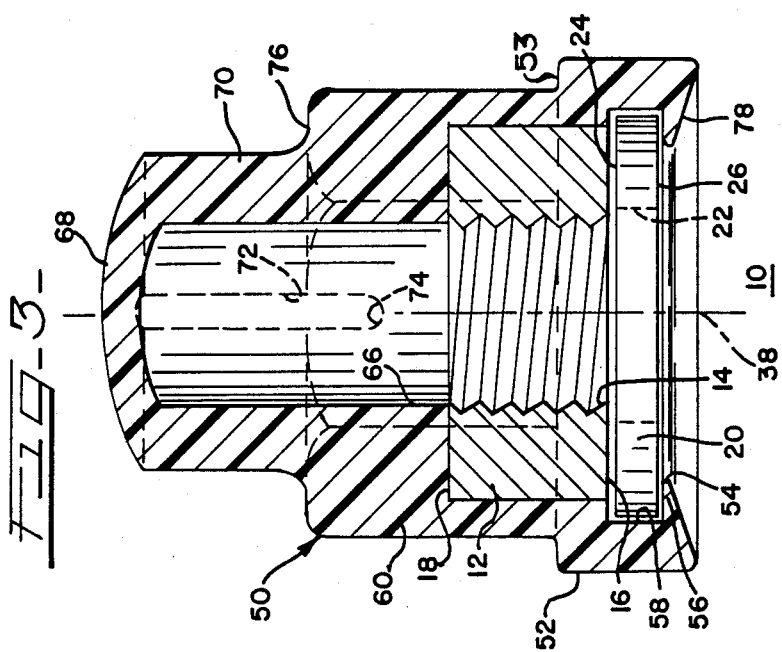
FIG. 3 is a cross-sectional view similar to FIG. 2 showing the plastic encapsulated nut and washer alone.

In accordance with the present invention and referring to FIG. 3, the encapsulated nut and washer assembly 10 includes a body or retainer 50 formed of molded plastic material and especially designed and adapted to encapsulate and enclose the ordinary metal hex nut 12 and portions of the washer 20 in abutting, adjacent relation thereto as shown in FIGS. 1, 2 and 3. The retainer is effective to maintain the threaded bore 14 of the hex nut 12 in coaxial alignment with the washer bore 22 along the axis 38 in readiness to receive a threaded shank 40 of a cap screw 42, bolt or other external threaded fastener element.

The retainer body 50 is formed of relatively rigid, somewhat resilient plastic material molded in place around the hex nut 12 to encapsulate the same and the body includes a lower cylindrical section 52 having a circular open end 54 partially closed by an inwardly extending annular lip 56 for loosely retaining the washer 20 within a cylindrical internal recess 58 as shown. The lower end segment 52 is integrally joined to an intermediate body portion 60 having a hexagonally-shaped transverse cross section with six (6) wrench flats 62 spaced outwardly parallel of respective wrench flats 64 on the sides of the hex nut 12 between the opposite end faces 16 and 18. An annular flat surface 53 at the junction between the lower end segment 52 and the intermediate body portion 60 provides a wrench stop on the body 50.

The intermediate body portion 60 is formed with an axially aligned extension bore segment 66 extending upwardly of the end face 18 of the embedded hex nut 12 coaxially along the central axis 38. The bore 66 projects upwardly into a cup-shaped cap or closed upper end section 70 of the plastic retainer body 50. The bore 66 has an internal diameter that is greater than the minimum thread diameter of the threaded bore 14 of the hex nut 12, but less than the maximum or major diameter of the threaded bore as shown in FIGS. 2, 3 and 4.

Accordingly, when the threaded shank portion 40 of a cap screw 42 or other threaded element is overdriven and extended into the bore 66 beyond the inner end face 18 of the hex nut 12, the threads interfere with and cut into the plastic material of the inner wall surface of the bore 66. The displaced plastic material engages the threads and provides a lock-nut function. Because the material of the retainer body 50 is molded in place around the hex nut 12 and is somewhat resilient, the initial threading of a threaded segment 40 of the cap screw 42 into the locking or extension bore 66 results in thread cutting action and at the same time serves to accommodate the over-travel of the threaded shank 40 as illustrated in FIG. 2.

The cap portion 70 of the plastic retainer body 50 is provided with a crowned outer end wall 68 and a cylindrical side wall having vertical slots 72 formed therein and spaced equilaterally around the central axis 38. The slots 72 extend downwardly into the intermediate body portion 60 and terminate at rounded lower ends 74 spaced below a transition level 76 or plateau formed between the upper cap 70 at the upper end of the plastic retainer body 50 and the intermediate hexagonal body portion 60. The equilaterally disposed slots 72 are designed to accommodate wrench elements of a specialized wrench or the like which can be mounted on the cap segment 70 for tightening or loosening the fastener assembly 10 as desired.

Referring now to FIG. 2, a cap screw 42 or other threaded element having a threaded shank 40 is first extended through the apertures 34 and 36 of the external members or parts 30 and 32 which are to be secured together and the threaded shank is passed through the central opening 22 in the captivated washer 20 to engage the female threads of the bore 14 of the encapsulated hex nut 12. The washer 20 is freely rotatable with respect to the embedded hex nut 12 until tightening is completed because the recess 58 of the plastic body 50 is slightly larger than the captivated washer 20.

The flats 70 of the intermediate body portion 60 of the retainer body 50 are provided to accommodate a conventional socket, open end or box end wrench, etc. so that the needed torque can be applied to the fastener assembly 10 while the hex head of the cap screw 42 is similarly held or turned by a wrench or other implement.

As the inner end of the threaded shank 40 initially engages the threaded bore segment 14 of the embedded hex nut 12, the washer 20 is still free to rotate relative to the hex nut because the recess 58 is slightly greater in thickness than the thickness of the washer 20 (as illustrated in exaggerated form in FIG. 3). Eventually, the free end portion of the threaded shank 40 penetrates upwardly into the cylindrical, locking or extension bore 66 provided in the upper portion of the intermediate body segment 60 and begins to cut threads into the plastic wall of the bore as continued threading proceeds.

As the threaded shank 40 is tightened in the nex nut 12 of the fastener assembly 10, the washer 48 is pressed against the underside of the external part 32 to squeeze the parts 30 and 32 tightly together against the exposed outer surface or end face 26 of the captivated washer 20.

The lip 56 of the body 50 has a shallow inwardly and upwardly extending frustoconically-shaped lower surface 78 (FIG. 3) and the lip is gradually forced or extruded radially outwardly from between the surfaces 26 and 28 as the shank is threaded further into the hex nut 12 until the approximate condition as shown in FIG. 2 is obtained wherein substantially all of the area of the abutting facing surfaces 26 and 28 of the washer 20 and the external member 30, respectively, are pressed tightly together in direct contact. The lower end face 24 of the hex nut 12 is pressed tightly against the upper surface 24 of the washer 20 to effect a tight seal and firmly secure the nut and washer assembly 10 in place and establish an enclosure and seal around the washer 20 against the upper surface 28 of the external part 30. The encapsulated nut 12 and the captivated washer 20 of the fastener assembly 10 is easy to use and provides a lock-nut feature and a tight peripheral, annular seal 78A (FIG. 2) around the outer perimeter or edge of the captivated washer 20. The engaged threaded segments of the external cap screw 42 and the encapsulated hex nut 12 are well protected from the external environment and are tightly sealed and enclosed to inhibit corrosion and deterioration.

From the foregoing, it will be seen that the encapsulated nut and washer assembly 10, including the hex nut 12, the captivated washer 20 and the retainer body 50 provides an economical, convenient and ready solution for pre-aligning and maintaining the female threaded bore 14 of the hex nut 12 in coaxial alignment with the bore 22 of captivated the washer 20 in readiness for assembly with an external threaded element, such as the a shank 40 of a cap screw 42 or other threaded element. The hollow extension bore 66 provides a lock-nut function and an annular seal 78A is established around the perimeter of the captivated washer 20 when the fastener assembly 10 is fully tightened.

The encapsulated nut and washer assembly 10 is formed by molding in place the hex nut 12 within the plastic body or retainer 50. The internal bore in the body 66 is formed along with the recess 58 on opposite sides of the nut during the original molding operation and after the molding process is complete, the washer 20 is inserted into the recess by deflection of the sealing lip 56 and movement of the washer inwardly through the opening 54. Once the washer is fully inserted in the recess 58, the lip 56 returns to a normal condition and the washer is loosely retained and is freely rotatable relative to the hex nut 12, which nut is secured against and rotated by the plastic retainer body 50.

The intermediate body portion 60 of the encapsulated nut and washer assembly 10 permits the use of an ordinary wrench for tightening or loosening and a specialized type of pin wrench may be utilized for tightening or loosening the fastener assembly 10 by extending pin elements into the elongated slots 72 formed in the upper end cap segment 70 and intermediate body portion 60 of the body 50.

While the invention has been described with reference to details of the illustrated embodiment, it should be understood that such details are not intended to limit the scope of the present invention as defined in the appended claims.

What is claimed and desired to be secured by Letters Patent of the United States is:

1. A fastener assembly comprising:
   a nut having a face and a threaded bore intersecting said face;
   a washer abutting said face having a central bore aligned with said threaded bore; and
   a body of plastic material permanently molded on said nut and encapsulating at least a portion of said nut and washer for retaining said washer in abutting relation to said face of said nut with said bore exposed to receive a threaded element engaging said threaded bore of said nut, said plastic body having an external surface for receiving tool means for turning said nut while threadedly engaging said threaded element.

2. The fastener of claim 1, wherein:
   said body includes means for loosely holding said washer abutting said face of said nut to permit free relative rotation therebetween.

3. The fastener of claim 1, wherein:
   said body includes an annular lip extending outwardly around said washer for sealing said fastener against an adjacent surface.

4. The fastener of claim 1, wherein:
   said nut includes planar sides forming a polygonal cross section transversely of said threaded bore; and
   said body includes sides spaced outwardly of said sides of said nut to form a shape for receiving tool means applied to turn said fastener assembly on said threaded element.

5. The fastener of claim 4, wherein:
   said body includes an annular ring around said washer intersecting said sides of said polygonal shape providing a wrench stop.

6. The fastener of claim 1, wherein:
   said body includes an extension bore in coaxial alignment with said threaded bore of said nut extending outwardly of a face of said nut opposite said face abutting said washer.

7. The fastener of claim 6, wherein:
   said body is formed of resilient plastic material and said extension bore is dimensioned to provide a lock nut function when engaged by a threaded element extending from said threaded bore of said nut.

8. The fastener of claim 7, wherein:
   said body includes a cap portion closing off an outer end of said extension bore for protecting said threaded element.

9. The fastener of claim 7, wherein:
   said extension bore is initially cylindrical in shape and has a diameter less than the outer thread diameter of said threaded element and greater than the root diameter thereof.

10. A nut and washer assembly, comprising:
    a metal nut having a threaded bore extending between opposite end faces and having planar sides extending between said end faces forming a polygonal cross-section transversely of said threaded bore;
    a metal washer having a central opening aligned with said threaded bore of said nut to receive a threaded member extended through said washer; and
    a body member formed of plastic material permanently affixed on said metal nut and having a first cavity for holding said nut, said body member having a second cavity having an open side facing away from said first cavity for holding said washer in abutting relation against an end face of said nut, said body member having external surface means for receiving a tool for turning said assembly on said threaded member when extended through said washer into said threaded bore of said nut.

11. The nut and washer assembly of claim 10, wherein:

said open side of said second cavity is formed by a washer retaining lip extending inwardly of an outer periphery of said washer toward said central bore and adapted to form a seal around said washer when said nut is pressed toward an adjacent surface upon tightening on said threaded member.

12. The nut and washer assembly of claim 11, wherein:

said body member includes a cylindrical ring around said second cavity and has a polygonal shaped cross-section body portion outwardly of said first cavity with planar surfaces outwardly parallel of said sides of said nut for receiving a wrench for tightening said nut on said threaded member.

13. The nut and washer assembly of claim 12, wherein:

said cylindrical ring of said body projects outwardly of said polygonal shaped cross-section body portion to form a stop surface for engaging a wrench applied to said body portion for tightening said nut on said threaded member.

14. The nut and washer assembly of claim 12, wherein:

said second cavity is positioned inside said cylindrical ring and is dimensioned to permit free rotation of said washer in said body relative to said nut.

15. The nut and washer assembly of claim 12, wherein:

said body includes a cap wall closing off said threaded bore of said nut on a side opposite of said washer.

16. The nut and washer assembly of claim 15, wherein:

said cap wall defines an extension bore coaxially aligned with said threaded bore of said nut.

17. The nut and washer assembly of claim 16, wherein:

said extension bore is dimensioned to engage outer portions of said threaded member extending through said nut for restraining relative rotation of said nut and threaded member.

18. A nut and washer assembly, comprising:

a hex nut;

a washer aligned and abutting a face of said hex nut; and a plastic retainer permanently molded around said nut and washer for holding said hex nut and washer in aligned and abutting relation and including an external surface engageable with a tool for turning said assembly on a threaded member.

19. The nut and washer assembly of claim 18, wherein:

said retainer includes annular seal means around a peripheral edge of said washer 20. The nut and washer assembly of claim 19, wherein:

said retainer includes a bore aligned with a threaded bore of said hex nut for lockingly engaging the threads of said threaded member engaged in said threaded bore.

* * * * *